March 5, 1957 D. S. BRINSMAID ET AL 2,784,115
METHOD OF PRODUCING TITANIUM DIOXIDE COATINGS
Filed May 4, 1953
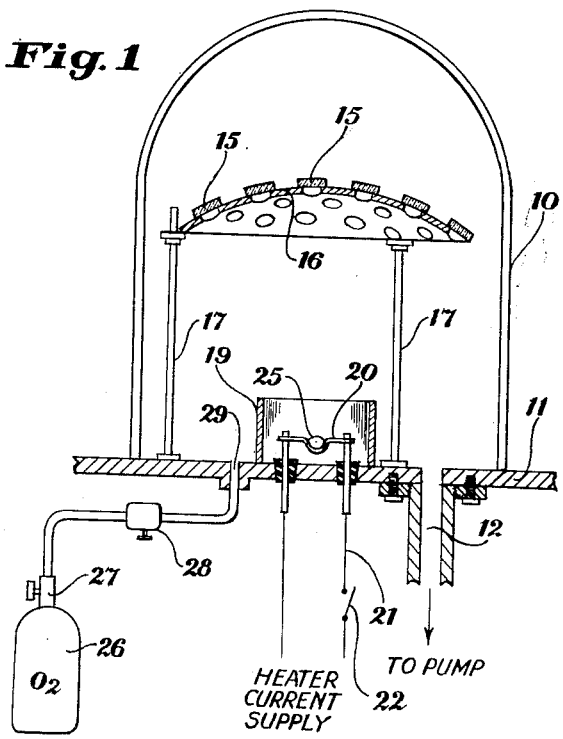
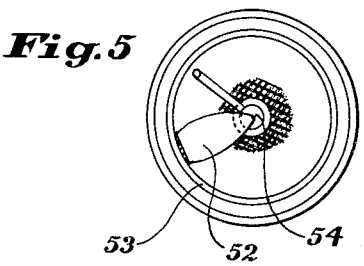
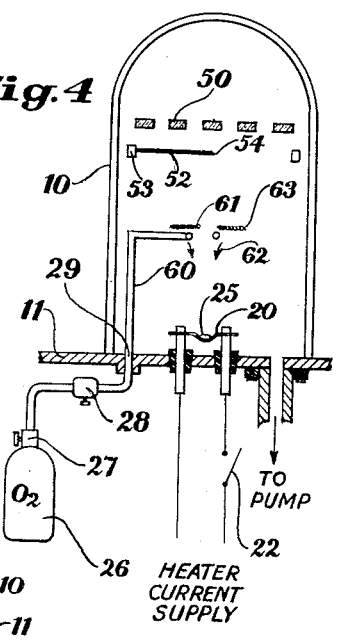
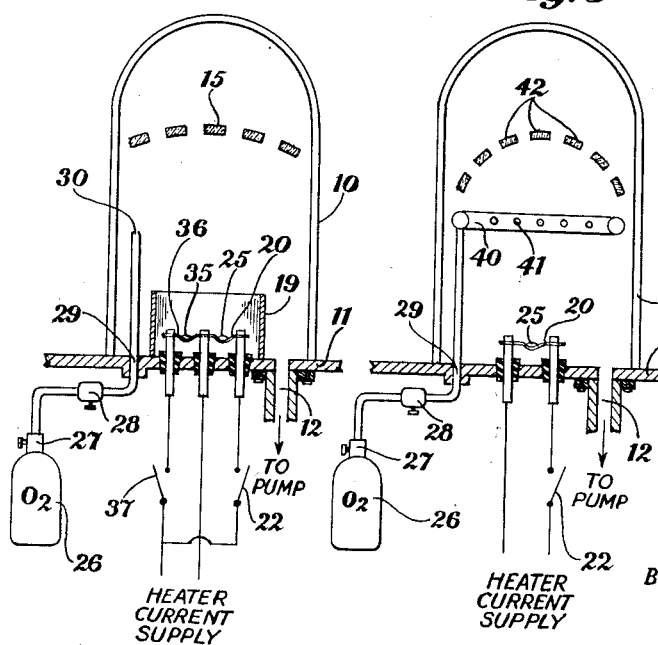
Doris S. Brinsmaid
William J. Keenan
George J. Koch
William F. Parsons
INVENTORS
ATTORNEYS United States Patent Office 2,784,115
Patented Mar. 5, 1957

2,784,115
METHOD OF PRODUCING TITANIUM DIOXIDE COATINGS

Doris S. Brinsmaid, William J. Keenan, George J. Koch, and William F. Parsons, Rochester, N. Y., assignors to Eastman Kodak Company, Rochester, N. Y., a corporation of New Jersey Application May 4, 1953, Serial No. 352,756

7 Claims. (Cl. 117—106)

This invention relates to the coating of optical elements by evaporation of the coating material in a vacuum such as is commonly performed in a bell jar.

The object of the present invention is to produce a durable highly transparent coating of titanium dioxide. Titanium dioxide has an index of refraction of about 2.4 and is quite useful in producing high reflecting coatings or as the high index material in multiple layer coatings used as filters, beam splitters, or the like. A particular object of the invention is to produce such coatings at a reasonable cost and in a manner which provides the uniformity necessary for commercial production.

Titanium dioxide coatings have been previously produced by various methods, but these involve various difficulties depending on the method used. If one attempts to evaporate titanium dioxide itself from a suitable electrically heated boat or filament, it is found that most forms of the oxide do not evaporate easily. Whatever form is used, it is found that the oxide breaks down and the resultant coating arriving at the optical element contains, in addition to titanium dioxide which is transparent, some titanium metal and some titanium monoxide or a combination of these with the dioxide, all of which results in a dark, sometimes black, coating. Such coatings have in the past then been baked in an oxygen atmosphere in order to oxidize the titanium metal and any suboxides of titanium in the coating. Also, some titanium dioxide coatings have been made by first coating metallic titanium and then baking the metallic coating in an oxygen atmosphere to convert it to titanium dioxide. However, both of these processes are restricted as to thickness of coating which can be made and both of them are expensive and inconvenient even when making thin coatings. In fact, any method which coats a dark coating rather than a pure titanium dioxide coating is difficult to control as to thickness. The main use of titanium dioxide is in optical interference coatings and in this case, it is necessary to control the thickness of the coating very accurately, such as by observation of the color of light reflecting therefrom. Such control is difficult or impossible with dark coatings requiring subsequent oxidation.

It is also difficult in some processes for coating titanium dioxide to avoid producing coatings which are not durable and which have an index of refraction lower than is desirable. Some prior processes tended to give spotty and mottled coatings for reasons so far unexplained.

All of these difficulties are overcome by the present invention. Titanium has an affinity for oxygen and is known for its gettering action. This property makes it peculiarly useful for the present invention described below.

According to the present invention a durable non-light-absorbing coating of titanium dioxide is produced on the surface of an optical element by evaporating metallic titanium (or less preferably an oxide of titanium) in a near vacuum of substantially pure oxygen with the optical element supported at a distance from the metallic titanium. The optical element may be a lens or a flat glass surface or a surface which already carries one or more coated layers of high or low index materials. For example, in producing an optical interference filter of alternate layers of titanium dioxide and magnesium fluoride, the present invention is just as applicable to an optical element already having six or seven layers as it is to the glass itself. Substantially pure oxygen must be used since, for example, coatings made through a near vacuum of air are inferior to those made through substantially pure oxygen. A separate application Serial No. 352,866, filed concurrently herewith by Keenan, Scharf and Parsons shows the manufacture of titanium nitride coatings, but the presence of a large proportion of nitrogen in the present process apparently produces inferior coatings. In some cases a small amount of moisture in the oxygen atmosphere has proven beneficial but this is not universally true and is not normally used in regular production coatings. The substantially pure oxygen atmospheres may include small amounts of other gas such as moisture vapor.

By far the most preferred form of the invention at present starts with metallic titanium rather than any of the oxides of titanium. However, the invention will work with oxides of titanium particularly those which evaporate easily. It is necessary to use a titanium oxygen material such as metallic titanium or one of the oxides of titanium since other compounds of titanium would involve molecules of a third element which would have to be disposed of and which would affect the vacuum. Metallic titanium is preferable partly because it has a slightly lower melting point than at least some of the oxides of titanium; and mainly because of its metallic nature, it is a better conductor of heat and hence reaches the melting point faster when the heat is turned on.

Preferably the pressure in the near vacuum must not be too low since insufficient oxygen allows some of the metallic titanium or a suboxide of titanium to be coated. This appears as a dark coating and is corrected simply by introducing slightly more oxygen into the vacuum.

Similarly, too high a pressure of oxygen is objectionable for various reasons. The oxygen molecules tend to interfere with the rate of coating and far too much time is required to obtain even a $\frac{1}{4}$ wavelength layer of titanium dioxide. The resultant coatings are soft and not durable. The index of refraction in some cases falls to 2.2 rather than 2.4. Also, and this is of considerable practical importance, in the preferred embodiment starting with metallic titanium the titanium tends to oxidize in the boat itself and to form an oxide or slag which is difficult to evaporate. Even with the optical element fairly close to the evaporating source, it may be, for practical purposes, impossible to obtain a full $\frac{1}{4}$ wavelength layer. As is well known to those familiar with vacuum technique, it is difficult to measure pressures precisely in a vacuum. However, it has been found for ordinary coating apparatus that an oxygen pressure below $2 \times 10^{-4}$ mm. Hg allows dark coatings to be produced and pressures above $3 \times 10^{-3}$ mm. Hg are so high that the resultant coatings are inferior. In fact those above $1 \times 10^{-3}$ mm. Hg require the optical element to be fairly near the source if a thick coating is required. Therefore, according to a preferred embodiment of the invention the near vacuum of substantially pure oxygen is at a pressure between $2 \times 10^{-4}$ and $3 \times 10^{-3}$ mm. Hg.

In ordinary commercial coating operations the vacuum pumps continue to evacuate the jar during the coating operation. Also, in the present invention the oxygen combines with the titanium en route to the optical surface or just as it arrives at the optical surface so that there is a loss of oxygen from the near vacuum atmosphere. According to a preferred embodiment of the invention, oxygen is continuously introduced into the near vacuum during the evaporation to balance the loss due to combining with titanium and also any loss due to the continuing evaporation by pumping so as to maintain a pressure between $2 \times 10^{-4}$ and $3 \times 10^{-3}$ mm. Hg.

The optimum pressure within this range is higher for optical elements close to the evaporating source and lower for those farther away. This naturally brings one to a consideration of the mean free path within the chamber. Until the titanium metal (or oxide of titanium) starts to evaporate, it is fairly easy to define the mean free path within the oxygen atmosphere that is present.

The standard formula for mean free path L is:

$$L = \frac{1}{\sqrt{2}\pi D^2 N}$$

where D is the effective diameter of each molecule and N is the number of molecules per cubic volume. L is in centimeters if D is in centimeters and N is the number per cubic centimeter. The value of D may be found in suitable tables and for oxygen it is about $3.6 \times 10^{-8}$ cms. N increases with pressure and decreases with increasing temperature (at constant pressure).

For example, at a temperature of 125° C. and a pressure of $2 \times 10^{-4}$ mm. Hg the mean free path in a uniform atmosphere of oxygen comes out about 37 centimeters. At the same temperature but at a pressure of $1 \times 10^{-3}$ mm. Hg, the mean free path is about 7 centimeters. At lower temperature, N is greater and the mean free path L is shorter.

The above calculations of mean free path do not take into account any lack of uniformity in the distribution of the oxygen molecules or any effect of the titanium molecules themselves. For practical purposes, the oxygen may be assumed to be uniformly distributed. Also, for several reasons the effect of the titanium molecules is not as great as may at first sight be anticipated. And in any case the mean free path determined by the oxygen molecules alone is a definite factor and may be used for defining the present invention even though the actual path of the titanium molecules between collisions is on the average somewhat less than this "mean free path of molecules in the oxygen."

The probable effect of the titanium (or oxide of titanium) is to contribute to the pressure particularly near the source and to contribute to the overall temperature because of the speed at which the titanium molecules are travelling. It is noted that some of the heat energy is used up in escaping from the surface of the molten titanium so that the molecules are not at the temperature of the molten mass. The excess temperature is eventually transferred to the oxygen particles and is taken into account in the temperature measurements.

Since the titanium molecules are in general (before collision) diverging from a small source they are more likely to hit oxygen than they are to hit other titanium molecules. Accordingly is is reasonable to specify the "mean free path in oxygen" (which is definite) when defining the present invention even though the actual path may be only ½ or ¾ of this definite value.

According to the present invention thus defined, the preferred range of pressure in the near vacuum is that at which the mean free path for molecules in the oxygen atmosphere is between .2 and 1 times the distance of the optical element from the source of evaporating titanium. The temperature changes during coating, but for calculating the mean free path it is sufficient to take an average value somewhere between the initial and final temperature of the oxygen, as measured by a simple mercury thermometer halfway between the evaporating source and the optical element.

It is realized that the measurements of temperature and pressure are not precise, but since the present invention is concerned only with orders of magnitude anyway, the precision is quite adequate. As pointed out, the pressure may differ over a range covering more than a power of ten and even the more precise definition in terms of mean free path covers a range of 5 to 1. Under the most precise measurements available it appears that there is a very slight darkening of the coating detectable when the mean free path is .9 rather than 1 times the distance of the optical element from the titanium but this was so small as to be negligible and measurements of temperature and pressure are really not precise enough to say that the limit is .9 rather than 1. The upper limit is 1, as closely as those working in this field make measurements of temperature and pressure. Of course this limit is modified by the factor due to the titanium molecules, as discussed above, but the invention is defined in terms of the mean free path in the oxygen atmosphere.

This limitation on the range of pressures in terms of mean free path is most critical with respect to the lower limit of pressure, i. e., with respect to the upper limit of mean free path, since there must be sufficient oxygen to provide enough collisions so that the titanium is fully oxidized. At the other end of the range, however, the absolute pressure is perhaps the most critical criterion since oxidizing of the titanium in the boat depends on this factor independent of the distance to the optical element. Accordingly, in the most preferred embodiment of the invention the pressure in the near vacuum of oxygen is maintained less than $3 \times 10^{-3}$ mm. Hg and greater than that in which the mean free path of molecules in the oxygen is equal to the distance of the optical element being coated from the metallic titanium in the boat.

It is an object of a preferred embodiment of the invention to provide a method of producing a coating on an optical element consisting of alternate layers of a low index compound and titanium dioxide. According to this embodiment of the invention the low index compound is evaporated in a near vacuum at less than $10^{-4}$ mm. Hg, such as at about $8 \times 10^{-5}$ mm. Hg. The evaporation is then stopped, substantially pure oxygen is introduced to bring the pressure up to about $5 \times 10^{-4}$ mm. Hg and within the range of pressures as discussed above while evaporating metallic titanium. In this case the upper limit of the range of pressures is preferably $1 \times 10^{-3}$ in order to permit rapid conversion to the lower pressure required for the next low index coating. This latter evaporating is then stopped and the pressure quickly reduced to less than $10^{-4}$ mm. Hg for evaporating of the next layer of low index compound such as magnesium fluoride. The fact that residual molecules in the chamber are oxygen even when the pressure is less than $10^{-4}$ mm. Hg has been found not to interfere with the coating of magnesium fluoride. The changeover from one pressure to the next is only a matter of seconds, particularly if the oxygen supply has a double valve system with the needle valve set to allow a standard amount of oxygen to leak in and the changeover is made simply by opening and closing an off-on valve ahead of the needle valve.

Since silicon dioxide forms an excellent low index material, no change in pressure is required when the successive layers are coated from metallic titanium and silicon monoxide in the oxygen atmosphere. However, we prefer to use the above discussed process with the rapid changes in pressure so that the alternate layers are titanium dioxide and magnesium fluoride.

The invention will be fully understood from the following description when read in connection with the accompanying drawing in which:

Fig. 1 illustrates schematically equipment used for production coating of titanium dioxide according to the present invention.

Fig. 2 similarly illustrates coating of alternate high and low index layers.

Figs. 3, 4, and 5, the latter being a plan view of the arrangement shown in Fig. 4, similarly illustrate embodiments of the present invention for coating a plurality of optical elements simultaneously.

In Fig. 1 bell jar 10 resting on a base plate 11 is evacuated in the usual way through an outlet 12 by suitable vacuum pumps. In the near vacuum thus created optical elements 15 are carried on a perforated concave support 16 supported by upright rods 17. The optical elements 15 are adjacent to the perforations in the concave plate 16 to receive material evaporated upward from an electrically heated boat 20. The boat is preferably a simple dimple in a ribbon of tungsten. The heater current for the boat 20 is provided through wires 21 and is turned off or on by a switch 22. In actual practice a variable transformer is used instead of the switch 22 for controlling the heater current but a simple switch is shown since the invention is more clearly understood when irrelevant details such as the use of a variable transformer are omitted. In the arrangement shown, metallic titanium 25 is supported in the boat 20 equidistant from the optical elements 15. As mentioned previously, the invention is applicable to any titanium oxygen material, but Fig. 1 illustrates the preferred embodiment using metallic titanium itself. Substantially pure oxygen from a tank 26 through an off-on valve 27 and a needle valve 28 is introduced through the base plate 11 into the near vacuum at a controlled rate. As pointed out above, this rate is controlled so as to balance loss of oxygen due to combining with titanium evaporating from the boat 20 and the loss through the pipe 29 and to maintain the oxygen pressure within the ranges specified above. As will be discussed below, various arrangements can be provided to introduce the oxygen into the chamber at any particular point desired, but for routine production purposes it has been found best to allow the oxygen to enter near the base plate itself so that it is practically uniformly diffused by the time it reaches the optical elements. That is, a uniform atmosphere of oxygen gives satisfactory results. Also, it has been noted that the oxygen has some effect on the distribution of the coating when the titanium is centrally located at the bottom of the bell jar as shown in Fig. 1. The net result is that the coating of the elements 15 which are near the center of the bell jar is somewhat thicker than that on the elements near the side of the bell jar even though all of the elements are at the same distance from the titanium 25. However, these differences have been found to be well within manufacturing tolerances and in normal commercial practice there is no point in trying to correct for this slight deviation from absolute uniformity.

It is customary to provide a cylindrical metal shield 19 to protect the sides of the bell jar 10 from being coated by the evaporating titanium. The oxygen is introduced outside of this shield 19 which also contributes to the uniformity of distribution of the oxygen in the space between the evaporating source and the optical elements.

Fig. 2 differs from Fig. 1 in two ways. The oxygen arriving through the pipe 29 passes through a restricted orifice 30 so as to tend to be concentrated higher in the bell jar and nearer the optical elements. In some cases, but not always, this appears to provide a faster coating rate. The metal shield 19 does not appreciably affect the distribution of oxygen in this particular arrangement. However, a slightly different arrangement in which the pipe 30 is bent at right angles to face horizontally and approximately tangentially introduces the oxygen so that it moves with a circular horizontal motion around the inside of the bell jar outside the shield 19. This has been found to produce quite acceptable uniformity of distribution of the oxygen molecules in the bell jar. Secondly, in addition to the titanium 25 in boat 20, magnesium fluoride 35 is provided in a boat 36 with a separate switch 37 to control the evaporation thereof. Again a variable transformer (not shown) is usually used to control the heater current. As discussed above, the pressure is maintained at about $5 \times 10^{-4}$ mm. Hg while titanium 25 is being evaporated, simply by closing the switch 22. When the switch 22 is opened, the valve 37 is closed, the pressure is quickly dropped to about $8 \times 10^{-5}$ mm. Hg, the switch 37 is closed, and magnesium fluoride is evaporated from the boat 36, all in that order. Then the switch 37 is opened, valve 27 is opened, so that the leak through valve 28 brings the pressure up to about $5 \times 10^{-4}$ mm. Hg and the switch 22 is closed to coat the next layer of titanium dioxide according to the invention. Variable transformers are usually used in place of the switches as discussed above.

While Fig. 2 illustrates the preferred arrangement for coating alternate layers of titanium dioxide and magnesium fluoride, it is pointed out that the present invention for coating titanium dioxide is a thoroughly practical one and introduces a lot of practical advantages even when the optical elements are moved back and forth from one bell jar to another when coating alternate layers of titanium dioxide and magnesium fluoride. It is true that this less preferable arrangement involves a number of complete pumping operations to establish a new vacuum for each and every layer of the coating, but it is still many, many times faster, much more convenient, and less expensive than any arrangement involving prolonged baking of the titanium or suboxide of titanium coating in an oxygen atmosphere such as in a suitable oven between every coating of titanium material and the successive coating of magnesium fluoride. The other advantages mentioned above are also present such as the ability to judge the coating thickness by the color when the layer is pure titanium dioxide as it falls on the surface.

In Fig. 3 still another arrangement is used for introducing the oxygen coming through the pipe 29. This oxygen proceeds upward and passes through a ring-shaped pipe 40 having orifices 41 facing inward to eject the oxygen in a horizontal sheet between the titanium 25 and the elements 42 which in this case are arranged on a shorter radius concave support so that the elements near the side of the jar are closer to the titanium 25 than those in the center of the jar. This latter feature is to provide greater uniformity of coating as discussed above.

In Figs. 4 and 5 the elements 50 are located in a flat plane and hence not equidistant from the source 25. For ordinary coating procedures, for example when coating magnesium fluoride, this lack of uniformity is eliminated by a cam shaped mask 52 which is carried in a ring 53 and rotates continuously in that ring with the point 54 staying fixed at the axis of the bell jar. This rotating mask cuts down on the amount of coating material arriving at the center and provides a uniform amount of coating material for all of the elements 50 lying in a flat plane. This part of the apparatus is not peculiar to the present invention. However, when an oxygen atmosphere is introduced it is found that the mask 52 is not the correct shape to provide a uniform coating and the coatings near the center receive greater thicknesses than those nearer the sides. For reasons which are difficult to explain, this lack of uniformity has been overcome by the two peculiar devices shown in Figs. 4 and 5.

First, the oxygen coming through the pipe 29 is fed through a very small pipe 60 to a small ring pipe 61 having orifices around the bottom thereof so that the oxygen is ejected in a downward direction as indicated by the arrows 62. The ring 61 is relatively small and does not appreciably interfere with the coating material as it proceeds upward during evaporation. However, this alone does not give uniform coatings. A wire screen 63 annular in shape around the outside of the ring 61 does give uniform coating, but the reason therefore is not clearly understood.

For practical purposes the arrangement shown in Fig. 1 has proven quite satisfactory and the only change which might be made to get even better uniformity would be to curve the support 16 to a slightly smaller radius.

In any case the present invention is primarily directed to the coating of one element and not to the various methods of extending this invention to the coating of a plurality of elements simultaneously.

We claim:

1. The method of coating on an optical element alternate layers of a low index compound and titanium dioxide which comprises evaporating the low index compound in a near vacuum at less than $10^{-4}$ mm. Hg stopping said evaporation, then introducing substantially pure oxygen to maintain the pressure between $2\times10^{-4}$ and $1\times10^{-3}$ mm. Hg while evaporating metallic titanium in said near vacuum, stopping the latter evaporating, then reducing the pressure to less than $10^{-4}$ mm. Hg for evaporating of the next layer of low index compound all with the optical element supported in said near vacuum at a distance from the sources of titanium and low index material.

2. The method of producing a durable non-light-absorbing coating of titanium dioxide on the surface of an optical element which comprises evaporating metallic titanium in a near vacuum of substantially pure oxygen with the optical element supported at a distance from the metallic titanium, while continuously introducing oxygen into the near vacuum during said evaporating, the rate of introduction balancing the loss due to combining with titanium and due to any continuing evacuation by pumping, to maintain a pressure between $2\times10^{-4}$ and $3\times10^{-3}$ mm. Hg in said near vacuum.

3. The method of producing a durable non-light-absorbing coating of titanium dioxide on the surface of an optical element which comprises evaporating metallic titanium in a near vacuum of substantially pure oxygen with the optical element supported at a distance from the metallic titanium, while continuously introducing oxygen into the near vacuum during said evaporating, the rate of introduction balancing the loss due to combining with titanium and due to any continuing evacuation by pumping, to maintain a pressure in said near vacuum, in which the mean free path for molecules in the oxygen atmosphere is between .2 and 1 times said distance of the element from the metallic titanium.

4. The method of producing a durable non-light-absorbing coating of titanium dioxide on the surface of an optical element which comprises evaporating metallic titanium in a near vacuum of substantially pure oxygen with the optical element supported at a distance from the metallic titanium, while continuously introducing oxygen into the near vacuum during said evaporating, the rate of introduction balancing the loss due to combining with titanium and due to any continuing evacuation by pumping, to maintain a pressure in said near vacuum less than $3\times10^{-3}$ mm. Hg and greater than that in which the mean free path for molecules in the oxygen atmosphere is equal to said distance of the element from the metallic titanium.

5. The method of producing a durable non-light-absorbing coating of titanium dioxide on the surface of an optical element which comprises evaporating a titanium material selected from the group consisting of metallic titanium and oxides of titanium in a near vacuum of substantially pure oxygen with the optical element supported at a distance from the material, while continuously introducing oxygen into the near vacuum during said evaporating, the rate of introduction balancing the loss due to combining with the titanium material and due to any continuing evacuation by pumping, to maintain a pressure between $2\times10^{-4}$ and $3\times10^{-3}$ mm. Hg in said near vacuum.

6. The method of producing a durable non-light-absorbing coating of titanium dioxide on the surface of an optical element which comprises evaporating a titanium material selected from the group consisting of metallic titanium and oxides of titanium in a near vacuum of substantially pure oxygen with the optical element supported at a distance from the material, while continuously introducing oxygen into the near vacuum during said evaporating, the rate of introduction balancing the loss due to combining with the titanium material and due to any continuing evacuation by pumping, to maintain a pressure in said near vacuum, in which the mean free path for molecules in the oxygen atmosphere is between .2 and 1 times said distance of the element from the material.

7. The method of producing a durable non-light-absorbing coating of titanium dioxide on the surface of an optical element which comprises evaporating a titanium material selected from the group consisting of metallic titanium and oxides of titanium in a near vacuum of substantially pure oxygen with the optical element supported at a distance from the material, while continuously introducing oxygen into the near vacuum during said evaporating, the rate of introduction balancing the loss due to combining with the titanium material and due to any continuing evacuation by pumping, to maintain a pressure in said near vacuum less than $3\times10^{-3}$ mm. Hg and greater than that in which the mean free path for molecules in the oxygen atmosphere is equal to said distance of the element from the material.

References Cited in the file of this patent

UNITED STATES PATENTS

| | | |
|---|---|---|
| 2,281,474 | Cartwright et al. | Apr. 28, 1942 |
| 2,539,149 | Miller | Jan. 23, 1951 |